3,488,736
PROCESS FOR THE DEHYDRATION AND
REARRANGEMENT OF HYDROXENIN
Joseph A. Kardys, Groton, and Jih-Hua Liu, New London, Conn., assignors to Chas. Pfizer & Co., Inc., New York, N.Y., a corporation of Delaware
No Drawing. Filed Apr. 10, 1967, Ser. No. 629,364
Int. Cl. C07c *67/02, 69/12;* C11c *3/10*
U.S. Cl. 260—491                                    11 Claims

ABSTRACT OF THE DISCLOSURE

An improved process for the dehydration and rearrangement of hydroxenin esters to vitamin A esters which comprises conducting said reactions in the presence of iodide ion in a liquid halogenated hydrocarbon solvent having a large dipole moment.

BACKGROUND OF THE INVENTION

This invention relates to an improved process for the conversion of hydroxenin derivatives to vitamin A derivatives and, more particularly, to an improved process for the dehydration and rearrangement of hydroxenin esters to vitamin A esters.

The practical synthesis of vitamin A on an industrial scale from citral, acetone and formaldehyde proceeds through a series of steps (Isler, et al., Helv. Chim. Acta 32, 489–505, 1949) to a $C_{20}$-glycol monoacetate, 1-acetoxy-3,7-dimethyl-6-hydroxy-9-(2′,6′,6′ - trimethyl cyclohexen-1′-yl)-nona-2,4,7-triene, referred to herein trivially as hydroxenin acetate. Conversion of this compound to vitamin A acetate via an allylic rearrangement and dehydration can be accomplished by treatment with (1) iodine or aqueous hydrogen iodide (Isler, U.S. Patent 2,451,739, issued Oct. 19, 1948), (2) by treatment with phosphorus oxychloride in the presence of pyridine (Isler, Chem. Eng. News 29, 3962 (1951), (3) by treatment with pyridine hydrobromide or pyridine p-toluenesulfonate in pyridine or glacial acetic acid (Milas, U.S. Patent 2,577,538, issued Dec. 4, 1951), and, more recently, (4) by treatment with aqueous hydrogen halide (HCl or HBr) (Lindlar, et al., U.S. Patent 2,610,207, issued Sept. 9, 1952) in a halogenated hydrocarbon having a large dipole moment followed by dehydrohalogenation of the thus-produced halogen compound with water or a basic agent in a halogenated hydrocarbon having a large dipole moment.

This conversion, applicable to various esters of hydroxenin, is summarized by the reactions:

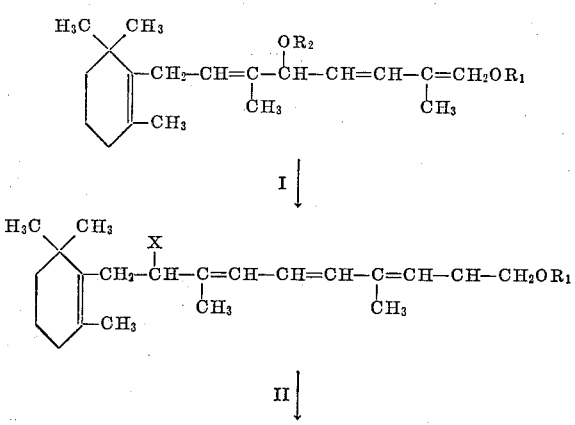

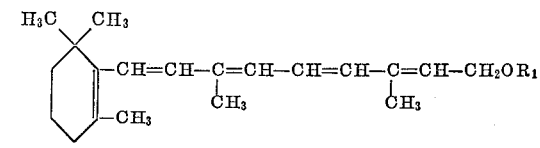

wherein $R_1$ is selected from the group consisting of acetyl and palmitoyl; $R_2$ is selected from the group consisting of hydrogen, acetyl and palmitoyl; and X is selected from the group consisting of bromo and chloro.

The prior art conversions, particularly the first process mentioned above, give a relatively poor yield of vitamin A derivatives. The second and third processes produce substantially better yields than does the first, e.g. about 70–80% compared to 45%. The fourth process reportedly affords yields of up to about 90% in certain instances but is characterized, as are the other processes, by a substantial variation in yield depending upon the particular hydroxenin derivative started with and the halogenated hydrocarbon solvent used.

SUMMARY OF THE INVENTION

It has now been found that when the allylic rearrangement from compound I to compound II and subsequent dehydrohalogenation from compound II to compound III according to method 4 above is conducted in the presence of iodide ion the formation of the intermediate halide compound (II) and the formation of the vitamin A derivatives appears to be accelerated, the choice of halogenated hydrocarbon solvent is extended beyond the range of those previously disclosed as useful for the realization of satisfactory yields of vitamin A derivatives, and, most important from an economic standpoint, improved yields (91–96%) relative to those afforded by the said prior processes are consistently obtained of a product having a favorable isomer balance. The ratio of trans to neo (trans-cis) vitamin A (and its derivatives) ranges from about 85–90% trans to about 15–10% neo.

The present process is applicable not only to the production of the above mentioned vitamin A esters but is also applicable to the production of vitamin A esters of a variety of carboxylic acids such as the propionate butyrate, caproate, laurate, caprylate, isovalerate, t-butyrate, 2,2-dimethyl-hexanoate, 3,4,4-trimethyl pentanoate, myristate and triethylacetate from the corresponding esters of 1,6 - dihydroxy-3,7-dimethyl-9-(2′,6′,6′-trimethylcyclohexen-1′-yl)-nona-2,4,7-triene (hydroxenin).

The process of this invention is carried out, in general, under an atmosphere of nitrogen by cooling a solution of the appropriate hydroxenin derivative in a suitable halogenated hydrocarbon solvent to a temperature of from about +5° C. to about −60° C., and adding to said solution aqueous hydrogen chloride or hydrogen bromide, and a source of iodide ion. The iodide ion may be added simultaneously with the hydrogen chloride or hydrogen bromide, or after a brief reaction period at a temperature of about 0° C. to 5° C. followed in rapid succession by aqueous alkali to quench the reaction, and a reducing agent to eliminate the presence of free iodine. Alternatively and preferably, a reverse quench procedure is used. That is, the reaction mixture containing the intermediate halide and iodide ion is added to water or a solution of aqueous alkali and the reducing agent subsequently added thereto. This reverse quench procedure affords more consistent and satisfactory yields than does the above mentioned quench procedure. Alkali is then added to provide a pH of from about 5 to about 9. Sodium borohydride is added, if desirable, to improve the stability of the product. The halogenated hydrocarbon phase is separated, washed with water and a small amount of pyridine is added. The solvents are then removed in vacuo and the concentrate crystallized from a suitable solvent system.

As emulsifiers there may be mentioned various derivatives of sorbitol such as the polyoxyalkylene sorbitan esters available from Atlas Powder Co., under the "Tween" trade name.

The pH of the reaction mixture, except for the initial reaction involving halogenation of the hydroxenin derivative is maintained at from about 2 to about 9. For all but the halogenation step, a pH of from about 5 to about 9 is favored.

In practice, it has been found advantageous to add small amounts of an antioxidant and an emulsifier to the reaction to minimize oxidative degradation of the products and to facilitate mixing, respectively. Suitable antioxidants are alkylated phenols such as 2,6-di-t-butyl-4-methylphenol and 2,2-methylenebis(4-methyl-6-t-butylphenol).

As noted above, the process of this invention permits greater flexibility in the choice of solvent than do the prior art methods. In addition to the halogenated hydrocarbon solvents such as those having large dipole moments, e.g. in the range of $1.15 \times 10^{-18}$ to about $2.1 \times 10^{-18}$ e.s.u.×cm. (chloroform, dichloromethane, sym-dichloroethylene, chlorobenzene) disclosed as useful for the hydrogen bromide rearrangement of hydroxenin (U.S. Patent 2,610,207), trichloroethylene, 1,2-dichloroethane, 1-chlorobutane and 2-chlorobutane can be used.

The source of the iodide ion is immaterial. The only criterion is that the particular source be soluble in water. As suitable sources there may be mentioned hydrogen iodide, ammonium iodide, alkali metal iodides, alkaline earth metal iodides, the iodides of cobalt, chromium, manganese, nickel, iron, zinc, cadmium, aluminum, rubidium, cerium and thorium. The favored sources are hydrogen iodide, the alkaline earth metal iodides and the alkali metal iodides. The preferred sources are hydrogen iodide, potassium iodide and sodium iodide.

The iodide is desirably added after the hydrogen halide but may be added prior to or simultaneously with the hydrogen halide (HBr or HCl). The amount of iodide used can vary over a wide range but is generally used at a level of from about 0.05 to about 0.5 mole per mole of hydrogen halide used. The reaction with the iodide in the presence of hydrogen halide is conducted at a temperature of from about —60° C. to about +5° C. and preferably at a temperature of from about —50° C. to about —20° C.

Suitable reducing agents are ascorbic acid, erythorbic acid, water soluble thiosulfates and bisulfites and alkali metal borohydrides. Sodium borohydride is the preferred reducing agent. The amount of reducing agent used varies from about 2% to about 10% by weight of iodide ion used.

DETAILED DESCRIPTION OF THE INVENTION

In the preferred embodiment of this invention the hydroxenin derivative and the hydrogen halide are allowed to react for a brief period, e.g. up to about 10 minutes in the halogenated hydrocarbon solvent, e.g. dichloromethane, 1,2-dichlorethane, sym-dichloroethylene, at a temperature of from about —60° C. to about +5° C. The iodide, e.g. potassium iodide, is then added to the mixture in the form of an aqueous solution together with alkali, e.g. sodium hydroxide, sodium carbonate, so as to bring the pH of the hydrohalogenation mixture to a value above pH 2 since at pH values below about 2 the yield of vitamin A derivatives decreases significantly, and at a temperature of about 0° to 5° C.

The mixture is stirred for 2-3 hours during which time the temperature is gradually increased to room temperature. At the end of this period sodium borohydride is added, the reaction mixture stirred for about 30–90 minutes and the product isolated by separation of the halogenated hydrocarbon phase as is described above.

The following examples are given by way of illustration and are not to be construed as limitations of this invention, many variations of which are possible within the scope and spirit thereof.

Example I

Hydroxenin diacetate (128 g.), Tween 80 (0.25 g., available from Atlas Powder Co., a sorbitan monooleate polyoxyalkylene derivative), and 2,6-di-t-butyl-4-methylphenol (0.5 g.) are dissolved in 1,2-dichloroethane (1000 ml.) under an atmosphere of nitrogen and cooled to —38° C. Hydrobromic acid (56 ml. of 63% solution) and hydriodic acid (4.5 ml. of 47% solution stabilized with 1.5% hypophosphorus acid) are added and the mixture stirred at —33° C. to —38° C. for five minutes. Potassium iodide (8.3 g.), sodium hydroxide (35 g.) and water (150 ml.) precooled to 0° C. to 5° C. are then added in rapid succession followed by ice water (500 ml.) containing sodium erythorbate (0.5 g.).

The reaction mixture is stirred for 2–5 hours while gradually raising the temperature to 20° C. Sodium carbonate (12 g.) and sodium borohydride (0.5 g.) are then added and the mixture stirred for one hour during which time the temperature is raised to 24° C. to 26° C. The 1,2-dichloroethane phase is separated and washed with water (3×200 ml.). The aqueous phase and wash solutions are extracted with 1,2-dichloroethane until all color is removed. The combined 1,2-dichloroethane extracts are treated with pyridine (2 ml.) and cooled overnight at —20° C. The solvent is then removed under reduced pressure at a temperature below 50° C. The concentrate (110 g.) upon assay is found to contain 91% vitamin A isomers. The neovitamin A content is found to be 12% by thin layer chromatography of the isomeric acetates. The product is purified by crystallization from isopropanol:water (7:1).

Example II

To a solution, under an atmosphere of nitrogen, of hydroxenin diacetate (128 g.), 2,6-di-t-butyl-4-methylphenol (0.5 g.) and Tween 80 (0.5 g.) in 1,2-dichloroethane (900 ml.) at —35° C. to —38° C. is added hydrobromic acid (65 ml. of 62% solution) over a two to three minute period. The mixture is stirred for five minutes then treated with water (150 ml.), precooled to 0° C. to 5° C., containing potassium iodide (16.6 g.) and sodium hydroxide (35 g.) and followed immediately by water (500 ml. at 0° C. to 5° C.) containing sodium erythorbate (0.5 g.).

The mixture is stirred for 90 minutes at 0° C. to 10° C., after which sodium hydroxide (85 ml. of 10% solution) is added and the mixture stirred for an additional 60 minutes while gradually increasing the temperature to 26° C. Sodium carbonate (12 g.) and sodium borohydride (0.5 g.) are added and stirring continued for an additional 90 minutes at the end of which time the 1,2-dichloroethane phase is separated and the product isolated as in Example I.

Example III

*Reverse quench procedure.*—A solution of hydroxenin diacetate (128 g.), 2,6-di-t-butyl-4-methylphenol (0.5 g.), Tween 80 (0.25 g.) and dichloromethane (1000 ml.), under an atmosphere of nitrogen, is cooled to —50° C. Dry Ice (25 g.), hydrobromic acid (56 ml. of 63% solution) and hydriodic acid (4.5 ml. of 47% solution reagent grade stabilized with 1.5% hypophosphorus acid) are added over a 30-second period. The mixture is stirred for five minutes at a temperature of from —40° to —50° C.

The reaction mixture is then poured over a 3- to 5-minute period into water (1000 ml.) precooled to 0–5° C., containing Tween 80 (0.25 g.), sodium hydroxide (21 g.), sodium carbonate (18.5 g.), potassium iodide (8.3 g.), and sodium erythorbate (0.5 g.). The mixture is stirred for two hours while gradually raising the temperature to 27° C. Aqueous sodium hydroxide solution (10%) is added as needed to maintain the pH at 5–6. Sodium bicarbonate (12 g.) and sodium borohydride (0.5 g.) are added, and the mixture stirred for one hour. The dichloromethane solvent phase is separated, washed with water (200 ml.) then vigorously stirred for one-half hour with water (500 ml.). The washed solvent layer is separated, treated with pyridine (2 ml.) and held overnight at −20° C. It is then stripped free of solvent under reduced pressure at a temperature below 50° C. The concentrate (109 g.) has a refractive index of 1.6120 and a USP potency of 94%.

The concentrate is obtained in crystalline form by addition to isopropanol-water (7–1).

Example IV

*Double reverse quench procedure.*—Hydrobromic acid (56% ml. of 63% solution) and hydriodic acid (4.5 ml. of 47% solution reagent grade stabilized with 1.5% hypophosphorous acid) are added to a solution of Tween 80 (0.25 g.) and 2,6-di-t-butyl-4-methylphenol (0.5 g.) in dichloromethane (400 ml.), cooled to −50° C. The solution is rapidly stirred. A solution of hydroxenindiacetate (128 g.) in dichloromethane (300 ml.), precooled to −50° C., is then slowly added over a period of two minutes. The mixture is stirred rapidly for five minutes while holding the temperature below −40° C. It is then added over a six-minute period to a solution of sodium hydroxide (35 g.), potassium iodide (8.3 g.), sodium erythorbate (0.5 g.) and Tween 80 (0.25 g.) in water (1000 ml.), preceded to 0°–5° C.

The mixture is stirred for two hours while gradually raising the temperature to 27° C. The pH is maintained at 5–6 by the addition of aqueous sodium hydroxide solution (10 percent), the mixture is then worked up according to the procedure of Example III to give 109 g. of concentrate having a potency of 94% and a refractive index of 1.6120.

Example V

Hydroxenin diacetate (1238 g.), Tween 80 (0.25 g., available from Atlas Powder Co., a sorbitan monooleate polyoxyalkylene derivative), and 2,6-di-t-butyl-4-methylphenol (0.5 g.) are dissolved in 1,2-dichloroethane (1000 ml.) under an atmosphere of nitrogen and cooled to −38° C. Hydrobromic acid (56 ml. of 63% solution) and hydriodic acid (4.5 ml. of 47% solution stabilized with 1.5% hypophosphorous acid) are added and the mixture stirred at −33° to −38° C. for five minutes (reaction time) at a temperature of −35° to −40° C.

The reaction mixture is then poured over a 3–5 minute period (reverse quench) into a solution of potassium iodide (8.3 g.), sodium hydroxide (35 g.) and sodium erythorbate (0.5 g.) in water (650 ml.) precooled to 0°–5° C. and stirred for 2–5 hours while gradually raising the temperature to 20° C. Sodium carbonate (12 g.) and sodium borohydride (0.5 g.) are then added and the mixture stirred for one hour during which time the temperature is raised to 24° C. to 26° C. The 1,2-dichloroethane phase is separated and washed with water (3× 200 ml.). The aqueous phase and wash solutions are extracted with 1,2-dichloroethane until all color is removed. The combined 1,2-dichloroethane extracts are treated with pyridine (2 ml.) and cooled overnight at −20° C. The solvent is then removed under reduced pressure at a temperature below 50° C. The concentrate (110 g.) upon assay is found to have a USP potency of 90% and a refractive index of 1.6105. The neovitamin A content is found to be 9% by thin layer chromatography of the isomeric acetates. The produce is purified by crystallization from isopropanol:water (7:1). The yield of crystalline vitamin A acetate is 80%.

Example VI

Repetition of the procedure of Example V but using dichloromethane in place of 1,2-dichloroethane as solvent produces a concentrate having a USP potency of 96%, a refractive index of 1.6116 and a neovitamin A content of 10%. An 83% yield of crystalline vitamin A acetate is obtained.

Example VII

The procedure of Example VI is repeated but using a reaction period of 7 minutes rather than 5 minutes for the hydrohalogenation reaction and a reverse quench of 17 minutes. The concentrate is found to have a USP potency of 94%, a refractive index of 1.6115 and a neovitamin A content of 12%. The yield of crystalline vitamin A acetate is 83%.

Example VIII

*Reverse quench procedure.*—A solution of hydroxenin diacetate (128 g.) 2,6-di-t-butyl-4-methylphenol (0.5 g.), Tween 80 (0.25 g.) and dichloromethane (700 ml.), under an atmosphere of nitrogen, is cooled to −50° C. Hydrobromic acid (56 ml. of 63% solution) and hydriodic acid (4.5 ml. of 47% solution reagent grade stabilized with 1.5% hypophosphorous acid) are added over a 2.5 minute period (addition time). The mixture is stirred for 3.75 minutes (reaction time) at a temperature of from −40° to −50° C.

The reaction mixture is then poured over a 1.25 minute period (quench time) into water (1000 ml.) precooled to 0°–5° C., containing Tween 80 (0.25 g.), sodium hydroxide (21 g.), sodium carbonate (18.5 g.), potassium iodide (8.3 g.), and sodium erythorbate (0.5 g.). The mixture is stirred for two hours while gradually raising the temperature to 27° C. Aqeuous sodium hydoxide solution (10%) is added as needed to maintain the pH at 5–6. Sodium carbonate (6 g.) and sodium borohydride (0.5 g.) are added, and the mixture stirred for one hour. The dichloromethane solvent phase is separated, washed with water (200 ml.) then vigorously stirred for one-half hour with water (500 ml.). The washed solvent layer is separated, treated with pyridine (2 ml.) and held overnight at −20° C. It is then stripped free of solvent under reduced pressure at a temperature below 50° C. The concentrate (103.7 g.) has a USP potency of 95%.

The concentrate is obtained in crystalline form by addition to isopropanol-water (7–1), yield of crystalline product, 82.7%.

The above procedure is repeated but using the addition, reaction and quench periods listed below. In each instance 3 g. rather than 6 g. of sodium carbonate is used in the reduction step.

Two control runs, performed under substantially the same conditions but using neither hydriodic acid nor potassium iodide, and 74 ml. of hydrobromic acid rather than 56 ml., and the addition, reaction and quench periods listed below gave poorer yields.

|   | A | B | C | D | 1 | 2 |
|---|---|---|---|---|---|---|
| Addition time | 2.5 | 2.75 | 2.5 | 2.5 | 3 | 3.25 |
| Reaction time | 3.0 | 3.0 | 3.5 | 3.5 | 3.5 | 3 |
| Quench time | 1.5 | 1.25 | 1.5 | 1.25 | 1.5 | 1.25 |
| Yield, g | 107.8 | 107.1 | 107.4 | 107.1 | 107.3 | 107 |
| Percent potency USP | 90.8 | 93.7 | 93.8 | 93.1 | 88 | 89 |
| Refractive index | 1.6116 | 1.6110 | 1.6117 | 1.6119 | 1.6102 | 1.6105 |
| Percent neo | 14 | 13 | 13 | 12 | 14 | 15 |
| Percent crystalline | 82.6 | 82.3 | 83.0 | 82.6 | 77.6 | 77.5 |

Example IX

The procedure of Example III is repeated but substituting an equivalent amount of the following hydroxenin esters for hydroxening diacetate: the monoacetate, and dipalmitate esters.

In each instance the conversions are equivalent to those of Example I.

What is claimed is:

1. In the process for the allylic rearrangement and dehydration of a compound having the formula

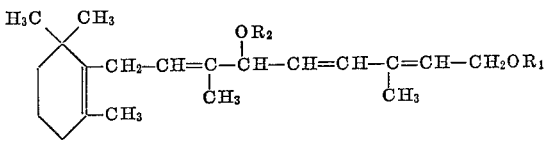

wherein $R_1$ is selected from the group consisting of acetyl and palmitoyl; and $R_2$ is selected from the group consisting of hydrogen, acetyl and palmitoyl by treating said compound, dissolved in a halogenated hydrocarbon having a dipole moment in the range of from about $1.15 \times 10^{-18}$ e.s.u.$\times$cm. to about $2.1 \times 10^{-18}$ e.s.u.$\times$cm. with an aqueous hydrogen halide selected from the group consisting of hydrogen chloride and hydrogen bromide and dehydrohalogenating the resulting halogen compound, dissolved in said halogenated hydrocarbon with an aqueous base or water, the improvement which comprises conducting said aqueous hydrogen halide treatment in the presence of an iodide selected from the group consisting of hydrogen iodide, alkali metal iodides and alkaline earth metal iodides.

2. The process of claim 1 wherein the reaction mixture following treatment with said iodide is added to an aqueous alkaline solution having a pH of from about 5 to about 9 and a temperature of from about 0° C. to about 5° C.

3. The process of claim 1 wherein each of $R_1$ and $R_2$ is acetyl.

4. The process of claim 2 wherein each of $R_1$ and $R_2$ is acetyl.

5. The process of claim 1 wherein the halogenated hydrocarbon is a chlorinated hydrocarbon.

6. The process of claim 5 wherein the halogenated hydrocarbon is 1,2-dichloroethane.

7. The process of claim 5 wherein the halogenated hydrocarbon is dichloromethane.

8. The process of claim 7 wherein the hydrogen halide is hydrogen bromide.

9. The process of claim 8 wherein the iodide is potassium iodide.

10. In the process for dehydrohalogenating a compound having the formula

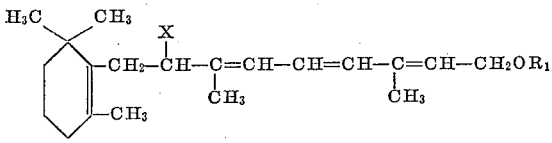

wherein X is selected from the group consisting of chloro and bromo; and $R_1$ is selected from the group consisting of acetyl and palmitoyl, dissolved in a halogenated hydrocarbon having a dipole moment in the range of from about $1.15 \times 10^{-18}$ e.s.u.$\times$cm. to about $2.1 \times 10^{-18}$ e.s.u.$\times$cm., by means of an aqueous alkaline solution, the improvement which comprises conducting the dehydrohalogenation treatment in the presence of a substance selected from the group consisting of hydrogen iodide, alkali metal iodides and alkaline earth metal iodides.

11. The process of claim 10 wherein the dehydrohalogenation treatment is conducted in the presence of potassium iodide at a pH of at least about 2.

References Cited

UNITED STATES PATENTS 2,451,739  10/1948  Isler _____ 260—491
2,610,207  9/1952  Lindlar et al. _____ 260—491

LORRAINE A. WEINBERGER, Primary Examiner
V. GARNER, Assistant Examiner

U.S. Cl. X.R.

260—488, 410

PC 4984

PO-1050
(5/69)

UNITED STATES PATENT OFFICE
CERTIFICATE OF CORRECTION

Patent No. __3,488,736__  Dated __January 6, 1970__

Inventor(s) __Joseph A. Kardys and Jih-Hua Liu__

It is certified that error appears in the above-identified patent and that said Letters Patent are hereby corrected as shown below:

Column 1, formula II, the right hand portion of the formula now reading "-C=CH-CH-CH$_2$OR$_1$" should read
$\qquad\qquad\qquad\qquad\qquad\qquad\quad$ |
$\qquad\qquad\qquad\qquad\qquad\qquad\;$ CH$_3$

-- -C=CH-CH$_2$OR$_1$ --.
$\;\;$ |
$\;$ CH$_3$

SIGNED AND
SEALED
JUL 7 1970

(SEAL)
Attest:

Edward M. Fletcher, Jr.
Attesting Officer

WILLIAM E. SCHUYLER, JR.
Commissioner of Patents